US009626447B2

(12) United States Patent
Onoda

(10) Patent No.: US 9,626,447 B2
(45) Date of Patent: Apr. 18, 2017

(54) NON-TRANSITORY COMPUTER-READABLE RECORDING MEDIUM HAVING RECORDED BROWSER PROGRAM THEREON

(71) Applicant: Konica Minolta, Inc., Chiyoda-ku (JP)

(72) Inventor: Yuko Onoda, Itami (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 402 days.

(21) Appl. No.: 14/045,627

(22) Filed: Oct. 3, 2013

(65) Prior Publication Data

US 2014/0101190 A1    Apr. 10, 2014

(30) Foreign Application Priority Data

Oct. 4, 2012   (JP) .................................. 2012-222166

(51) Int. Cl.
G06F 7/00        (2006.01)
G06F 17/30       (2006.01)

(52) U.S. Cl.
CPC .............................. G06F 17/30887 (2013.01)

(58) Field of Classification Search
CPC ......... G06F 17/30864; G06F 17/30067; G06F 17/30867; G06Q 10/10; G06Q 30/02
(Continued)

(56) References Cited

U.S. PATENT DOCUMENTS 6,119,078 A *  9/2000  Kobayakawa ........ G06F 17/272
                                                    704/3
7,376,650 B1 * 5/2008  Ruhlen ............. G06F 17/30876
(Continued)

FOREIGN PATENT DOCUMENTS

JP    2000-250803 A    9/2000
JP    2002-007431 A    1/2002
(Continued)

OTHER PUBLICATIONS

Office Action (Notification of Reasons for Refusal) issued on Nov. 18, 2014, by the Japan Patent Office in corresponding Japanese Patent Application No. 2012-222166, and an English Translation of the Office Action. (3 pages).

*Primary Examiner* — Robert Beausoliel, Jr.
*Assistant Examiner* — Michael Pham
(74) *Attorney, Agent, or Firm* — Buchanan Ingersoll & Rooney PC

(57) ABSTRACT

A non-transitory computer-readable recording medium having recorded thereon a browser program running on a computer including a storage unit storing a table showing correspondences between text languages of web pages and character strings used in URLs to indicate the text languages, the program causing the computer to perform: receiving a designation of a URL; acquiring information indicating a text language designated by a user; determining whether the designated URL includes a top-level domain "com" or the top-level domain "com" with a slash "/" added thereto; acquiring, when determination is affirmative, source code of a web page indicated by the designated URL, and searching the source code for a URL including a character string corresponding to the designated text language; and, displaying, when the URL is found, a web page indicated by the found URL, and, displaying, when the URL is not found, the web page indicated by the designated URL.

20 Claims, 19 Drawing Sheets

(58) Field of Classification Search
USPC .......................................................... 707/758
See application file for complete search history.

(56) References Cited

U.S. PATENT DOCUMENTS

| | | | |
|---|---|---|---|
| 2004/0015584 A1* | 1/2004 | Cartmell | G06F 17/30887 709/225 |
| 2007/0006067 A1 | 1/2007 | Kikuchi | |
| 2008/0244000 A1 | 10/2008 | Nakamura et al. | |
| 2008/0294796 A1* | 11/2008 | Lee | G06F 17/30887 709/245 |
| 2009/0144612 A1* | 6/2009 | Ishii | G06F 9/4448 715/234 |
| 2009/0187566 A1* | 7/2009 | Zha | G06F 17/3071 |
| 2011/0137981 A1* | 6/2011 | Ookuma | G06F 9/4448 709/203 |
| 2012/0054192 A1* | 3/2012 | Song | G06F 17/30887 707/741 |

FOREIGN PATENT DOCUMENTS

| | | |
|---|---|---|
| JP | 2002-108749 A | 4/2002 |
| JP | 2005-216152 A | 8/2005 |
| JP | 2006-119706 A | 5/2006 |
| JP | 2006-135774 A | 5/2006 |
| JP | 2007-011765 A | 1/2007 |
| JP | 2008-250491 A | 10/2008 |
| JP | 2009-134489 A | 6/2009 |
| JP | 2009-169113 A | 7/2009 |
| JP | 2011-123620 A | 6/2011 |

* cited by examiner

FIG. 3

| Text language indicator character string | Text language |
|---|---|
| fr | French |
| de | German |
| at | |
| it | Italian |
| es | Spanish |
| ar | |
| cn | Chinese |
| tw | |
| pt | Portuguese |
| br | |
| ru | Russian |
| nl | Dutch |
| fi | Finnish |
| no | Norwegian |
| dk | Danish |
| kr | Korean |
| th | Thai |
| JP | Japanese |
| us | English |
| uk | |
| au | |
| ............ | ......... |
| ............ | ......... |
| ............ | ......... |
| ............ | ......... |

FIG. 4

| User ID | Designated text language |
|---|---|
| User01 | French |
| User02 | Japanese |
| User03 | Danish |
| User04 | German |
| ....... | ....... |
| ....... | ....... |
| ....... | ....... |

FIG. 6

```
<html>
<head>
<title>AK COMPANY GLOBAL SITE</title>
........  ........  ........  ........
........  ........  ........  ........
</head>
<body>
```
┌──────────────────────────────────────────┐ ─ 61
│<div id=" content_AK" >                   │
│<h1><img src=" images/main_photo.jpg"     │
│width=" 890" height=" 743" alt=" AK COMPANY│
│GLOBAL" ></h1>                            │
└──────────────────────────────────────────┘
┌──────────────────────────────────────────┐ ─ 62
│<div id=" globaloperation" >              │
│<h2>We Seek for Technology Innovation</h2>│
│<ul>                                      │
│<li><a                                    │
│href=" http://www.akcompany" .com/prodacut/" >│
│<img src> =" /common_V4/src/images/       │
│globaloperation/btn_prodauct.gif"         │
│alt=" Products"                           │
│title=" Products" width=" 178" height=" 31"│
│</a></li>                                 │
│<li><a                                    │
│href=" http://www.akcompany.com/service/" >│
│<img src="/common_V4/src/images/          │
│globaloperation/                          │
│btn_service.gif" alt="Services"           │
│title="Services" width="178" height="31"  │
│</a></li>                                 │
│<li><a                                    │
│href ="http://www.akcompany.com/support/">│
│<img src="/common_V4/src/images/          │
│globaloperation/                          │
│btn_download.gif" alt="Supports"          │
│title="Supports" width="178" height="31"  │
│</a></li>                                 │
│<li><a                                    │
│href ="http://www.akcompany.com/download/">│
│<img src="/common_V4/src/images/          │
│globaloperation/                          │
│btn_download.gif" alt="Downloads"         │
│title="Downloads" width="178" height="31" │
│</a></li>                                 │
│<li><a                                    │
│href ="http://www.akcompany.com/aboutus/">│
│<img src="/common_V4/src/images/          │
│globaloperation/                          │
│btn_aboutus.gif" alt="About US"           │
│title="About US" width="178" height="31"  │
└──────────────────────────────────────────┘
```
........  ........  ........  ........
........  ........  ........  ........
........  ........  ........  ........
........  ........  ........  ........
```

63 ─
┌──────────────────────────────────────────────┐
│<div id="jumpBar">                            │
│<img src="images/txt_around.gif" width="135"  │
│height="10" alt="AKCompany Around World"/>    │
│<div id="country-selector" class="prog-dropdown">│
│<ul>                                          │
│<li><a onmouseout="window.status=' ' "        │
│href="http://www.akcompany.at">AK Austria</a></li>│
│<li><a onmouseout="window.status=' ' "        │
│href="http://www.akcompany.be">AK Belgium</a></li>│
│<li><a onmouseout="window.status=' ' "        │
│href="http://www.akcompany.dk">AK Denmark</a></li>│
│<li><a onmouseout="window.status=' ' "        │
│href="http://www.akcompany.fi">AK Finland</a></li>│
│<li><a onmouseout="window.status=' ' "        │
│href="http://www.akcompany.fr">AK France</a></li>│
│<li><a onmouseout="window.status=' ' "        │
│href="http://www.akcompany.de">AK Germany</a></li>│
│<li><a onmouseout="window.status=' ' "        │
│href="http://www.akcompany.hu">AK Hungary</a></li>│
│<li><a onmouseout="window.status=' ' "        │
│href="http://www.akcompany.it">AK Italy</a></li>│
│<li><a onmouseout="window.status=' ' "        │
│href="http://www.akcompany.nl">AK Netherlands</a></li>│
│<li><a onmouseout="window.status=' ' "        │
│href="http://www.akcompany.no">AK Norway</a></li>│
│<li><a onmouseout="window.status=' ' "        │
│href="http://www.akcompany.pl">AK Poland</a></li>│
│<li><a onmouseout="window.status=' ' "        │
│href="http://www.akcompany.pt">AK Portugal</a></li>│
│<li><a onmouseout="window.status=' ' "        │
│href="http://www.akcompany.es">AK Spain</a></li>│
│<li><a onmouseout="window.status=' ' "        │
│href="http://www.akcompany.ru">AK Russia</a></li>│
│<li><a onmouseout="window.status=' ' "        │
│href="http://www.akcompany.se">AK Sweden</a></li>│
│<li><a onmouseout="window.status=' ' "        │
│href="http://www.akcompany.com.cn">AK China</a></li>│
│<li><a onmouseout="window.status=' ' "        │
│href="http://www.akcompany.com.kr">AK Korea</a></li>│
│<li><a onmouseout="window.status=' ' "        │
│href="http://www.akcompany.com.th">AK Thailand</a></li>│
│<li><a onmouseout="window.status=' ' "        │
│href="http://www.akcompany.com.vn">AK Vietnam</a></li>│
│<li><a onmouseout="window.status=' ' "        │
│href="http://www.akcompany.co.jp">AK Japan</a></li>│
│........  ........  ........  ........        │
│........  ........  ........  ........        │
│</body>                                       │
│</html>                                       │
└──────────────────────────────────────────────┘
```

FIG. 14

| User ID | Designated text language | Designated provider country |
|---------|--------------------------|------------------------------|
| User01  | French                   | France                       |
| User02  | Japanese                 | Japan                        |
| User03  | Danish                   | Denmark                      |
| User04  | German                   | Austria                      |
| ······  | ······                   | ······                       |
| ······  | ······                   | ······                       |
| ······  | ······                   | ······                       |

FIG. 15

| Text language indicator character string | Provider country | Text language |
|---|---|---|
| fr | France | French |
| de | Germany | German |
| at | Austria | |
| it | Italy | Italian |
| es | Spain | Spanish |
| ar | Argentina | |
| cn | China | Chinese |
| tw | Taiwan | |
| pt | Portugal | Portuguese |
| br | Brazil | |
| ru | Russia | Russian |
| nl | Netherlands | Dutch |
| fi | Finland | Finnish |
| no | Norway | Norwegian |
| dk | Denmark | Danish |
| kr | Korea | Korean |
| th | Thailand | Thai |
| JP | Japan | Japanese |
| us | USA | English |
| uk | UK | |
| au | Australia | |
| ............ | ............ | ............ |

FIG. 17

| list of index page indicator character strings | worldwide/index.html<br>global/index.html<br>worldwide_sites<br>country-selector<br>countryselector<br>global-network<br>directory/index.html<br>locations<br>changecountry |
|---|---|

FIG. 19A

```
<html>
<head>
<title>ABC COMPANY GLOBAL SITE</title>
........
</head>
<body>
........
<li><a href="www.ABCcompany.com/worldwide/index.html">Country/Region</a></li>    ← 191
........
</body>
</html>
```

FIG. 19B

```
<html>
<head>
<title>ABC COMPANY GLOBAL SITE</title>
........
</head>
<body>
........
<li><a href="http://www.ABCcompany.com.ar/">Argentina (Spanish)</a></li>
<a href="http://www.ABCcompany.com.at/">Austria (German)</a></li>
<a href="http://www.ABCcompany.com.br/">Brazil (Portuguese)</a></li>
........
<a href="http://www.ABCcompany.com.dk/">Denmark (Danish)</a></li>
........
</body>
</html>
```
                                                              ↑ 192

NON-TRANSITORY COMPUTER-READABLE RECORDING MEDIUM HAVING RECORDED BROWSER PROGRAM THEREON

CROSS-REFERENCE TO RELATED APPLICATIONS

This application is based on application No. 2012-222166 filed in Japan, the contents of which are hereby incorporated by reference.

BACKGROUND OF THE INVENTION (1) Field of the Invention

The present invention relates to a browser program for use in a display apparatus having a browser function and displaying a web page acquired from a web server over the network, and in particular to technology for acquiring a web page in a desired text language via a so-called global website, and displaying the acquired web page.

(2) Related Art

In recent years, in order to provide web pages in multiple text languages, a website (so-called global website) (hereinafter, referred to as the "global website") having links to web pages in multiple text languages has been provided via a web server. A website refers to a group of web pages that share a common domain name in a uniform resource locator (URL) and have a hierarchical structure.

Global websites are created mostly by international companies having operations worldwide, and provided for users via web servers managed by the international companies. A user accesses a web server providing a global website via a terminal and the like having a browser function, and acquires a web page in a desired text language from the web server via the global website to view the acquired web page.

Specifically, a user accesses a home page (a web page at the top of web pages having a hierarchical structure, a web page indicated by a URL http://(domain name)/, here) of a global website via a terminal, selects a link to a web page in a desired text language from a list of links to web pages in multiple text languages to acquire the web page in the desired text language from a web server, and causes the terminal to display the acquired web page to view the acquired web page.

Meanwhile, a location and a size of the list of links to the web pages as described above as well as a method for displaying the link differ among global websites. There are some global websites at which it is not easy to find a location of the list from a home page. At such global websites, it takes a long time for users to find the list. Furthermore, at global websites providing many options for links, it might take a long time for users to specify and select a link to a web page in a desired text language from a home page.

As technology to eliminate the above-mentioned problems, the following technology is disclosed: A server stores therein URLs of web pages as link targets in association with text languages of the web pages indicated by the URLs. Upon transmission of information on a desired language from a user's terminal to the server, the server specifies a URL corresponding to the desired language, and transmits the specified URL to the user's terminal (see Japanese Patent Application Publication No. 2008-250491).

This technology enables a user to acquire the web page in the desired text language from the web server via the URL transmitted from the server without spending much time and effort, and to display the acquired web page on the terminal to view the acquired web page.

With the above-mentioned technology, however, it is necessary to provide the server for storing therein the URLs of the web pages as the link targets. This adds to the complexity of a device configuration and a device cost.

SUMMARY OF THE INVENTION

In order to solve the above-mentioned problems, a non-transitory computer-readable recording medium having recorded thereon a browser program pertaining to one aspect of the present invention is a non-transitory computer-readable recording medium having recorded thereon a browser program running on a computer including a storage unit that stores a table showing correspondences between text languages of web pages and character strings used in URLs to indicate the respective text languages, the browser program causing the computer to perforin: a receiving step of receiving a designation of a URL; an acquiring step of acquiring information indicating a text language designated by a user; a determining step of determining whether or not the designated URL includes, at the end thereof, a top-level domain "coin" or the top-level domain "com" with a slash "/" added to the end thereof; a searching step of, when a result of the determination in the determining step is affirmative, acquiring source code of a web page indicated by the designated URL, and searching the acquired source code for a URL including a character string corresponding to the designated text language with reference to the table stored in the storage unit; and a display control step of, when the URL including the character string corresponding to the designated text language is found in the searching step, acquiring a web page indicated by the found URL from a web server over a network and displaying the acquired web page indicated by the found URL, and, when the URL including the character string corresponding to the designated text language is not found in the searching step, displaying the web page indicated by the designated URL according to the acquired source code.

BRIEF DESCRIPTION OF THE DRAWINGS

These and other objects, advantages and features of the invention will become apparent from the following description thereof taken in conjunction with the accompanying drawings those illustrate a specific embodiments of the invention.

In the drawings:

FIG. 3 shows a specific example of a character string/language correspondence table;

FIG. 4 shows a specific example of user information;

FIG. 6 shows a specific example of web data as source code of a home page of a group of web pages constituting a global website;

FIG. 14 shows a modification of the user information;

FIG. 15 shows a modification of the character string/language correspondence table;

FIG. 17 shows a specific example of a list of index page indicator character strings;

FIG. 19A shows a specific example of source code of a home page of a group of web pages constituting a global website indicated by a URL including an index page indicator character string, and FIG. 19B shows a specific example of source code of the web page indicated by the URL.

DESCRIPTION OF PREFERRED EMBODIMENTS

[1] Structure of Browser System

Figure 1:
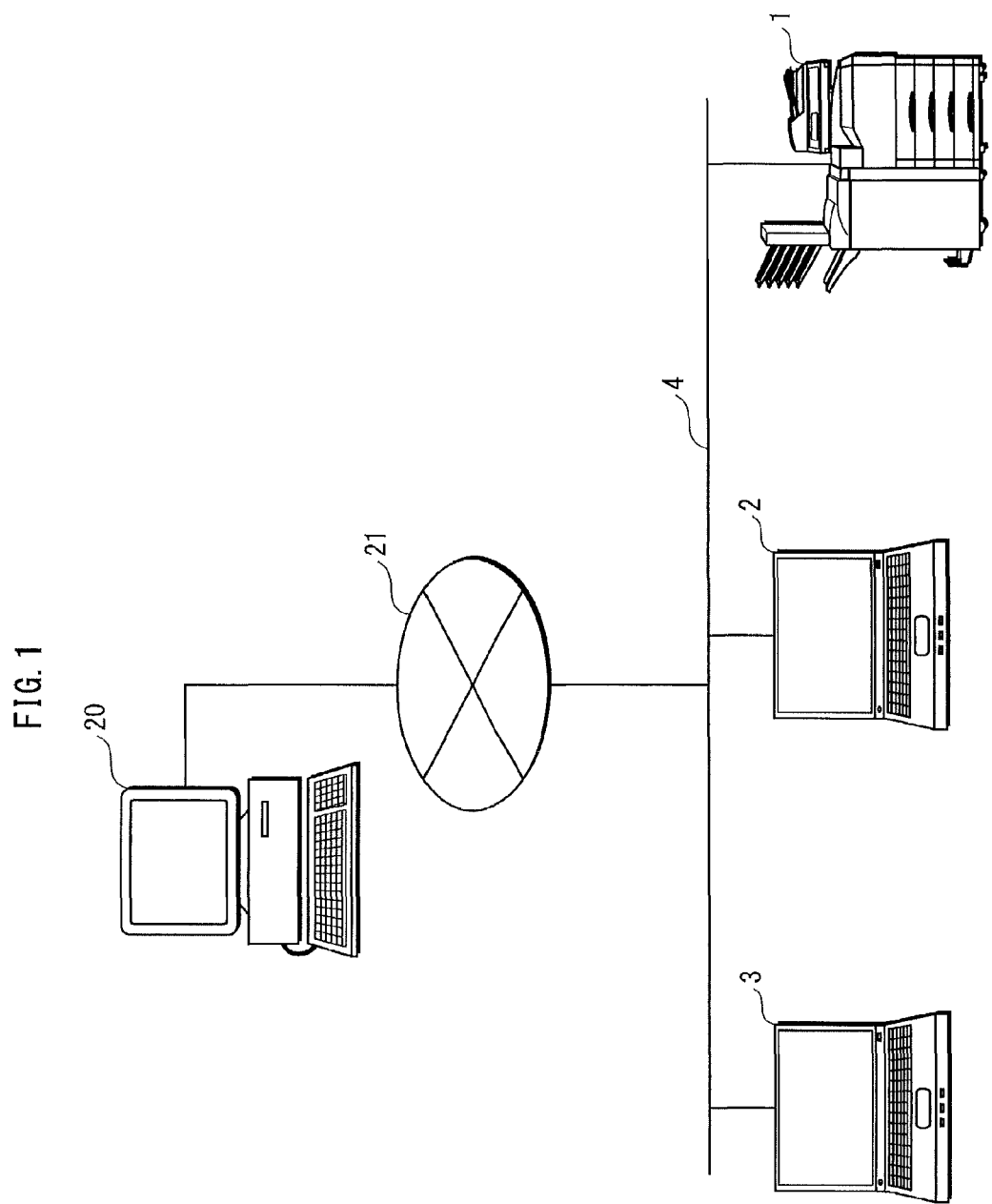
FIG. 1 is a schematic diagram illustrating the structure of a browser system pertaining to the present embodiment.

FIG. 1 is a schematic diagram illustrating the structure of a browser system pertaining to the present embodiment. The browser system pertaining to the present embodiment includes an image forming apparatus 1, personal computers (PCs) 2 and 3, a web server 20, a local area network (LAN) 4, and an internet 21. Although only one web server is illustrated in FIG. 1 for convenience' sake, the number of web servers is not limited to one, and all web servers connected to the internet 21 are included in the browser system.

The image forming apparatus 1, and the PCs 1 and 2 are connected by the LAN 4. The LAN 4 is connected to the internet 21 via a router (not illustrated) so that each of the image forming apparatus 1, and the PCs 2 and 3 can access a web server (e.g. the web server 20) connected to the internet 21.

Figure 2:
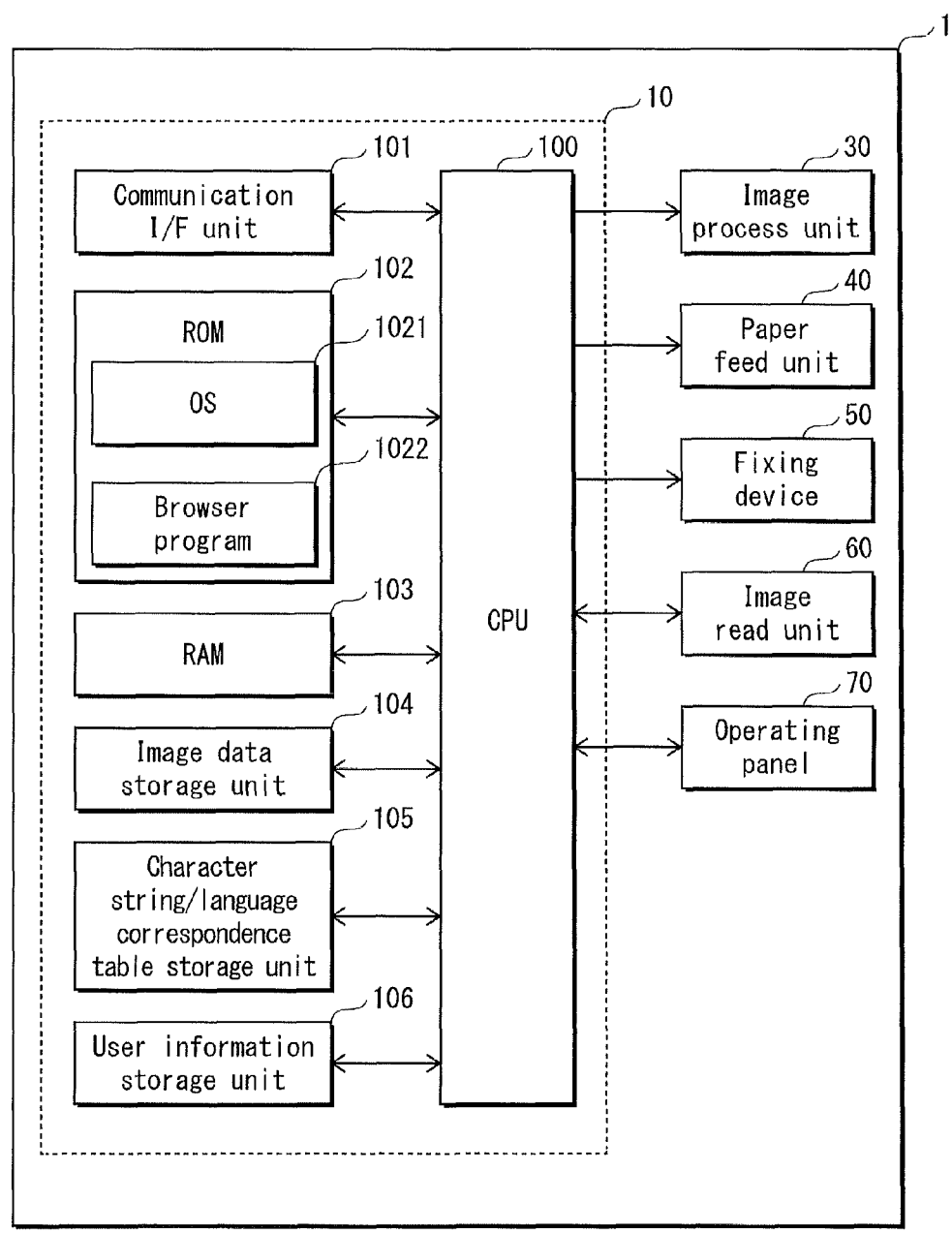
FIG. 2 is a functional block diagram showing the structure of an image forming apparatus 1.

FIG. 2 is a functional block diagram showing the structure of the image forming apparatus 1. The image forming apparatus 1 includes a control unit 10, an image process unit 30, a paper feed unit 40, a fixing device 50, an image read unit 60, and an operating panel 70.

The control unit 10 includes a CPU 100, a communication interface (I/F) unit 101, ROM 102, RAM 103, an image data storage unit 104, a character string/language correspondence table storage unit 105, and a user information storage unit 106. The control unit 10 controls an overall operation of the image forming apparatus 1.

The communication I/F unit 101 is an interface to connect to a LAN such as a LAN card and a LAN board. The ROM 102 stores therein an operating system (OS) 1021, a browser program 1022, and a control program for controlling the image process unit 30, the paper feed unit 40, the fixing device 50, the image read unit 60, and the operating panel 70.

The OS 1021 is a program for controlling an operation of the control unit 10. Various programs stored in the ROM 102 are executed under the control of the OS 1021. Examples of the OS 1021 are WINDOWS (registered trademark) and UNIX (registered trademark). The browser program 1022 is application software for viewing web pages provided by web servers via the internet 21.

The RAM 103 is used as a work area for the CPU 100 during execution of a program. The image data storage unit 104 stores therein image data for printing input via the communication I/F unit 101, the image read unit 60, or the like.

The character string/language correspondence table storage unit 105 stores a character string/language correspondence table therein. The character string/language correspondence table refers to a table showing correspondences between character strings used in URLs to indicate languages of text (hereinafter, referred to as "text languages") of web pages indicated by the URLs and the text languages indicated by the respective character strings. Hereinafter, the above-mentioned character strings indicating the text languages are referred to as "text language indicator character strings".

Examples of the text language indicator character strings are country codes (ISO 3166) and language codes (ISO 639) defined by the International Organization for Standardization (ISO). The country codes and the language codes may be used in combination. In the present embodiment, the country codes are used as the text language indicator character strings.

By associating the country codes with languages used in countries indicated by the country codes as the text languages pertaining to the countries, the character string/language correspondence table is created. For example a country code "fr", which indicates France, is associated with French, a country code "at", which indicates Austria, is associated with German, which is the language used in Austria, and a country code "br", which indicates Brazil, is associated with Portuguese, which is the language used in Brazil.

The character string/language correspondence table can be created in advance and stored in the character string/language correspondence table storage unit 105 by associating the text language indicator character strings with the text languages in the above-mentioned manner.

When the language codes are used as the text language indicator character strings, the character string/language correspondence table can be created in advance and stored in the character string/language correspondence table storage unit 105 by associating the language codes with languages indicated by the language codes as the text languages corresponding to the language codes in a similar manner.

URLs of web pages in text languages used in respective countries provided by global websites often include, as character strings, the above-mentioned codes defined by the ISO. Therefore, by specifying a text language indicator character string corresponding to a text language designated by a user with reference to the character string/language correspondence table, and by searching source code of a home page of a global website for a URL including the specified text language indicator character string in a web page display language control processing described later, a web page in the text language designated by the user can be acquired.

FIG. 3 shows a specific example of the character string/language correspondence table. As shown in FIG. 3, text languages, German, Spanish, Chinese, Portuguese, and English, are each associated with a plurality of country codes, whereas text languages, French, Italian, Russian, Dutch, Finnish, Norwegian, Danish, Korean, That, and Japanese, are each associated with a single country code.

Referring back to FIG. 2, the user information storage unit 106 stores user information therein. The user information refers to information showing correspondences between identification numbers (IDs) of users using the image forming apparatus 1 and text languages (hereinafter, referred to as "designated text languages") designated by the respective users. The user IDs are input along with passwords via the operating panel 70 when the respective users log into the image forming apparatus 1.

FIG. 4 shows a specific example of the user information. In the example shown in FIG. 4, users whose user IDs are "User01", "User02", "User03", and "User04" respectively designate French, Japanese, Danish, and German as the text languages.

Referring back to FIG. 2, the CPU 100 controls the image process unit 30, the paper feed unit 40, the fixing device 50, the image read unit 60, and the operating panel 70 by executing the OS 1021 and control programs, and performs the web page display language control processing (described later) by executing the browser program 1022.

The image process unit 30 performs printing by forming an image on a paper as a recording sheet fed from the paper feed unit 40, based on image data for printing input via the control unit 10 or the image read unit 60. The paper feed unit 40 feeds the paper as the recording sheet to the image process unit 30 according to instructions from the control unit 10. The fixing device 50 thermally fixes, onto the paper as the recording sheet, the image formed on the paper according to instructions from the control unit 10.

The image read unit 60 includes an image input device such as a scanner, and reads information, such as letters and graphics, appearing on a recording sheet such as a paper to form image data. The operating panel 70 includes a plurality of input keys and a liquid crystal display unit. A touch panel is laminated on a surface of the liquid crystal display unit. The operating panel 70 receives instructions from users by touch input from the touch panel or key input from the input keys, and notifies the control unit 10 of the received instructions.

Figure 5:
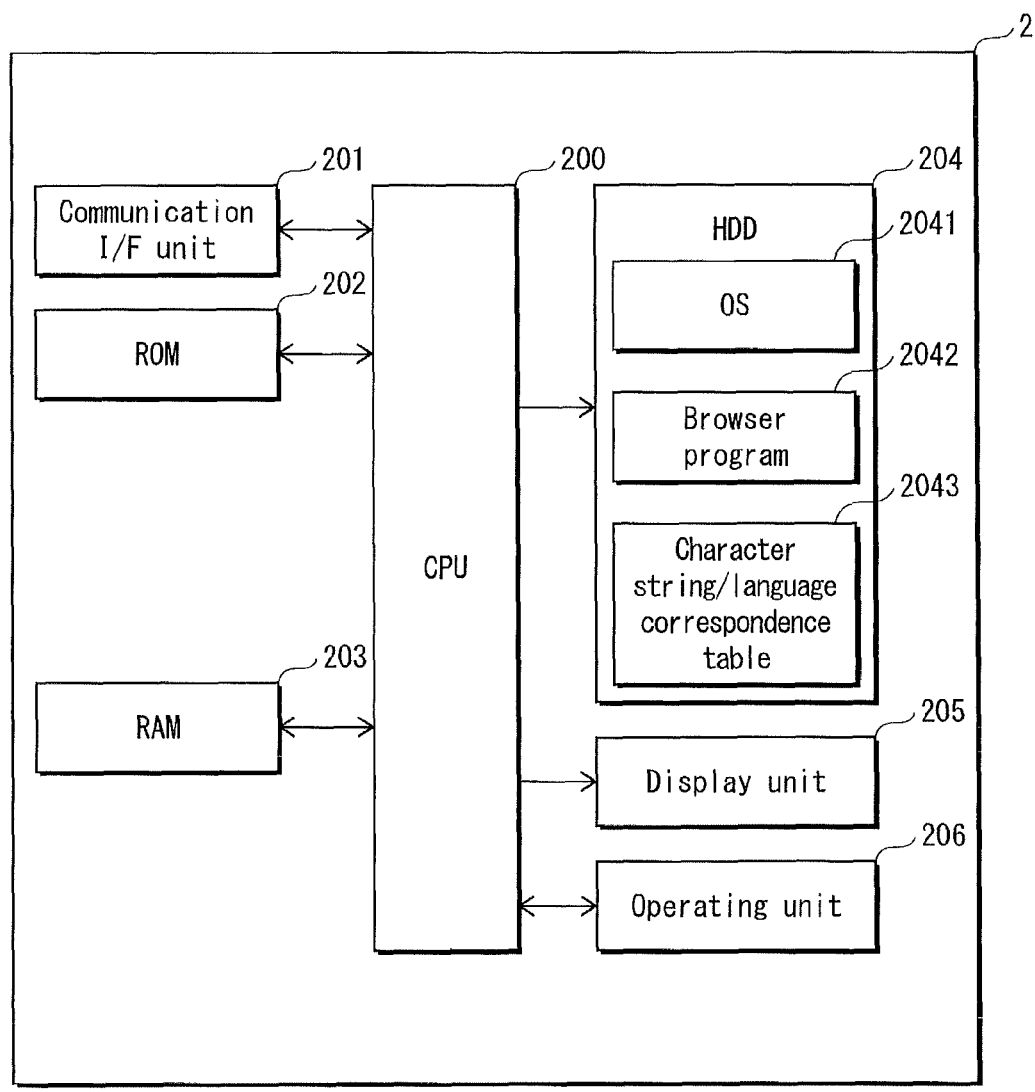
FIG. 5 is a functional block diagram showing the structure of a PC 2.

Referring back to FIG. 1, the structures of the PCs 2 and 3 are described next. Since the PCs 2 and 3 have the same structure, only the structure of the PC 2 is described below. FIG. 5 is a functional block diagram showing the structure of the PC 2. The PC 2 includes a CPU 200, a communication I/F unit 201, ROM 202, RAM 203, a hard disk drive (HDD) 204, a display unit 205, and an operating unit 206.

The CPU 200 executes various programs stored in the ROM 202 and the HDD 204. The ROM 202 stores therein various programs for achieving the functions as a personal computer. The RAM 203 is used as a work area for the CPU 200 during execution of a program.

The HDD 204 stores therein an OS 2041, a browser program 2042, a character string/language correspondence table 2043, and the like. Various programs and the browser program 2042 stored in the ROM 202 are executed under the control of the OS 2041. The character string/language correspondence table 2043 is the same as the character string/language correspondence table stored in the character string/language correspondence table storage unit 105.

The display unit 205 includes a liquid crystal display, and displays thereon web pages and the like. The operating unit 206 includes a keyboard or a mouse, and receives input of instructions from users.

Referring back to FIG. 1, the web server 20 stores therein web data constituting each global website. Upon receiving a Hyper Text Transfer Protocol (HTTP) request with a designation of a URL from the image forming apparatus 1, the PCs 1 and 2, and the like, the web server 20 transmits web data corresponding to the received request to a sender of the request. The web data refers to data constituting each of web pages of a global website, and, for example, is source data (hereinafter, referred to as "source code") of each web page written in Hyper Text Markup Language (HTML), Extensible Markup Language (XML), and the like, data from a still image file such as a Graphics Interchange Format (GIF) file, a Joint Photographic Experts Group (JPEG) file, and the like, data from a moving image file in a Flash Video format and the like, and data from an audio file such as MPEG Audio Layer-3 (MPEG3), and the like.

Figure 7:
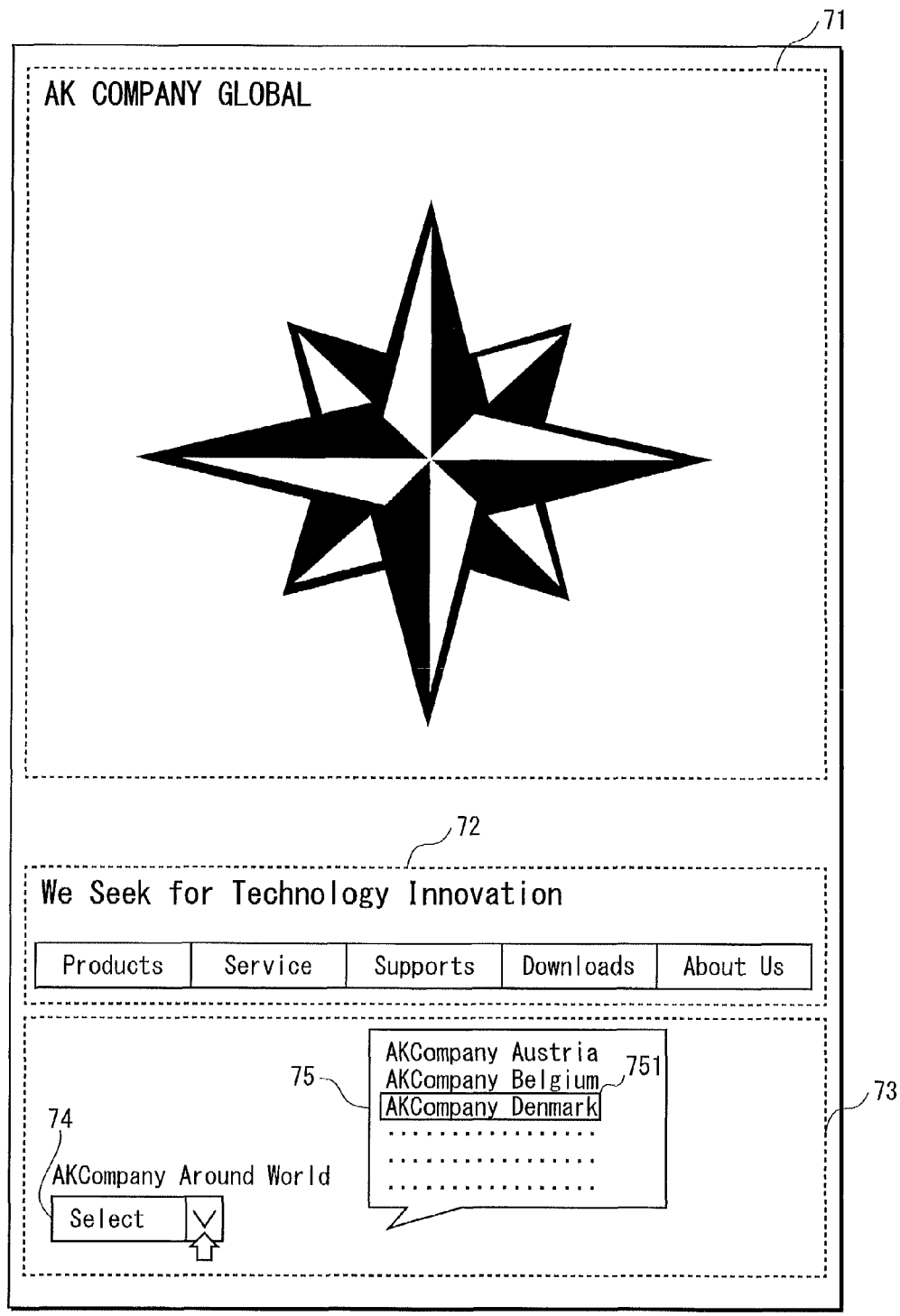
FIG. 7 shows a specific example of a web page displayed on a display unit based on description of the source code of the home page of the group of web pages constituting the global website.

FIG. 6 shows a specific example of web data as source code of a home page of a group of web pages constituting a global website (a home page indicated by a URL "http://www.akcompany.com/"). FIG. 7 shows a specific example of a web page displayed on the display unit based on description of the source code. Parts of the description of the source code within a dotted rectangle 61, a dotted rectangle 62, and a dotted rectangle 63 in FIG. 6 respectively represent parts of a web page within a dotted rectangle 71, a dotted rectangle 72, and a dotted rectangle 73 in FIG. 7.

A box 74 in FIG. 7 is provided to select one of links to web pages indicated by respective URLs including the text language indicator character strings (character strings each following "href=" and enclosed in quotation marks (" ")). The URLs including the language indicator character strings are found in a part of the description of the source code within the dotted rectangle 63 in FIG. 6. By clicking a part of the box 74 indicated by a white arrow, the links to the web pages indicated by the respective URLs including the text language indicator character strings are displayed as a popup window 75. The popup window is actually displayed on the box 74 in FIG. 7, although it is illustrated at an offset position in FIG. 7 for convenience' sake. By moving a cursor 751 displayed within the popup window onto a desired link, a user can select the desired link.

[2] Web Page Display Language Control Processing

Figure 8:
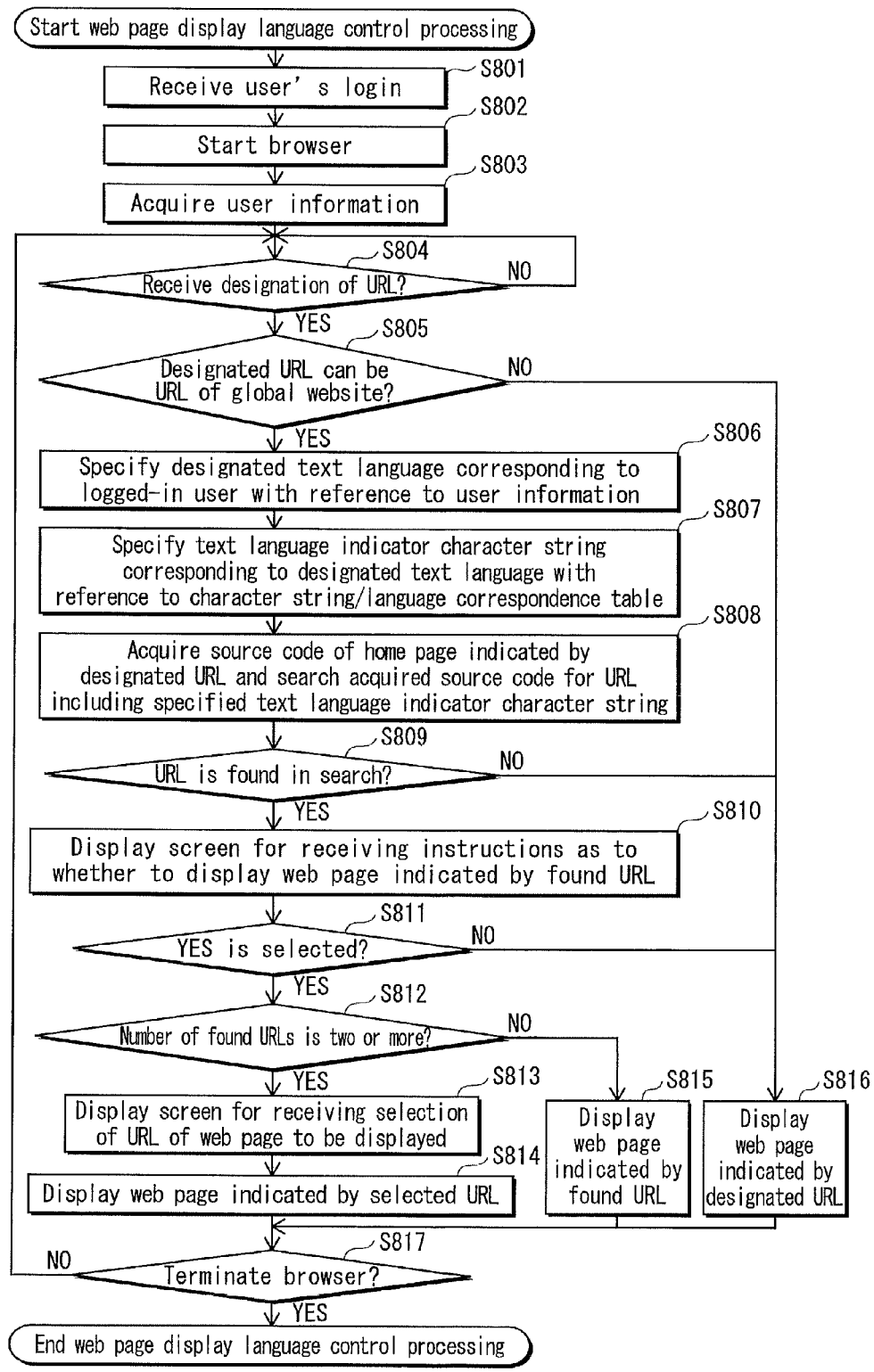
FIG. 8 is a flow chart showing a web page display language control processing performed by a control unit 10.

FIG. 8 is a flow chart showing the web page display language control processing performed by the control unit 10. The control unit 10 receives a user's login (input of a user ID and a password) via the operating panel 70 (step S801). Upon further receiving input of a browser start instruction via the operating panel 70, the control unit 10 starts a browser by executing a browser program 1022 stored in the ROM 102 (step S802), and acquires the user information stored in the user information storage unit 106 (step S803).

Upon further receiving a designation of a URL via the operating panel 70 (step S804: YES), the control unit 10 determines whether or not the designated URL includes, at the end thereof, a predetermined top-level domain or the predetermined top-level domain with a slash "/", which is a delimiter, added to the end thereof (step S805). When the designated URL includes a top-level domain at the end thereof, the control unit 10 recognizes that a designation of a URL including the top-level domain with the slash "/"

added to the end thereof has been received. For example, when a designation of a URL including a top-level domain "coin" at the end thereof is received, the control unit 10 recognizes that a designation of a URL including a character string "com/" at the end thereof has been received. This is because the slash "/" is often omitted in the designation of the URL.

The top-level domain refers to a domain name that is at the end of domain names having a hierarchical structure and delimited by a dot ".". For example, in a case of a URL "http:AKcompany.com/", the top-level domain is "com", and, in a case of a URL "http:AKcompany.co.jp", the top-level domain is "jp".

In this step S805, whether or not there is a possibility that the designated URL is a URL of a global website is determined. That is to say, when the designated URL is a URL of a home page, and a top-level domain of the designated URL is a predetermined top-level domain frequently used in URLs of global websites, it is determined that there is a possibility that the designated URL is a URL of a global website.

As the predetermined top-level domain, top-level domains frequently used in URLs of global websites are searched and selected in advance by a manufacturer of the image forming apparatus 1. In the present embodiment, a top-level domain "com" is used as the predetermined top-level domain.

When a result of the determination in step S805 is affirmative, i.e. when there is a possibility that the designated URL is a URL of a home page of a global website (S805: YES), the control unit 10 specifies a designated text language corresponding to a user ID of the user with reference to the acquired user information (step S806), and further specifies a text language indicator character string corresponding to the specified designated text language with reference to the character string/language correspondence table stored in the character string/language correspondence table storage unit 105 (step S807).

The control unit 10 then transmits an HTTP request to a web server indicated by a domain name in the designated URL along with a designation of the URL, acquires source code of a home page indicated by the designated URL from the web server, and searches the acquired source code for a URL including the text language indicator character string specified in step S807 (searches character strings (character strings each following "href=" and enclosed in quotation marks (" ")) indicating the URLs in the source code for a URL including the specified text language indicator character string) (step S808).

For example, when the acquired source code is source code shown in FIG. 6, and the specified text language indicator character string is "fr", which corresponds to French, a character string "http://www.akcompany.fr", which is a character string following "href=" and enclosed in quotation marks (" "), indicated by a white arrow in FIG. 6 is found in the search as an URL including the specified text language indicator character string.

Country codes and language codes are separated from other alphabetical letters by delimiters (a period ".", a slash "/", an underscore "_", and the like) in the URLs (for example, a country code "us" is included in URLs in the form of ".us", "/us", "_us", and the like). Therefore, only character strings delimited by delimiters may be targeted for the search.

This prevents a URL including a character string that is the same as any of the country codes and language codes, and does not indicate a text language of a web page indicated by the URL from being found in the search, thereby increasing accuracy of the search. For example, when the text language designated by a user is English, a URL "http://www.akcompany.com/aboutus/", which is included in a part of the description within the rectangle 62 in FIG. 6 and includes a character string "us/" at the end thereof is prevented from being found in the search as the URL including the text language indicator character string.

Figure 9:
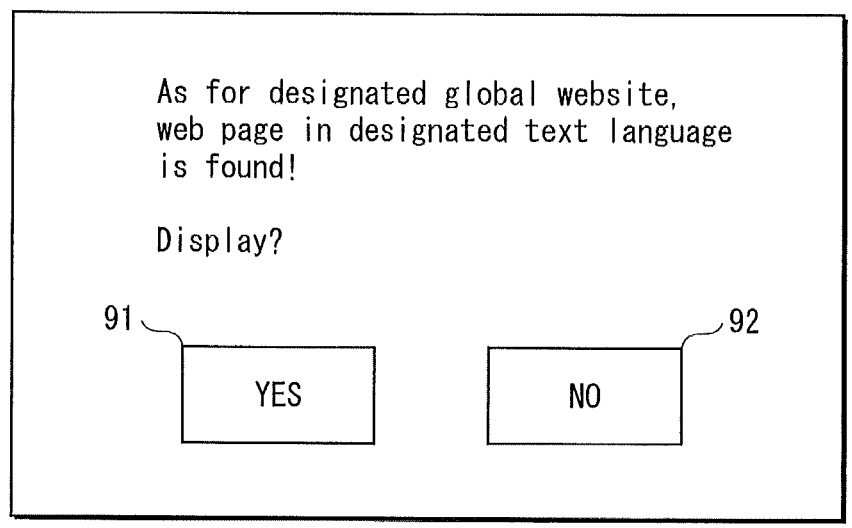
FIG. 9 illustrates a specific example of a GUI display screen for receiving instructions as to whether to display a web page indicated by a URL found in search in the web page display language control processing shown in FIG. 8.

When the URL including the specified text language indicator character string is found in the search in step S808 (step S809: YES), the control unit 10 displays a Graphic User Interface (GUI) display screen for receiving instructions as to whether to display, on the liquid crystal display unit included in the operating panel 70, a web page indicated by the URL found in the search (step S810). FIG. 9 shows a specific example of the above-mentioned GUI display screen. Reference signs 91 and 92 respectively indicate a selection button to select "Yes" and a selection button to select "No".

Figure 10:
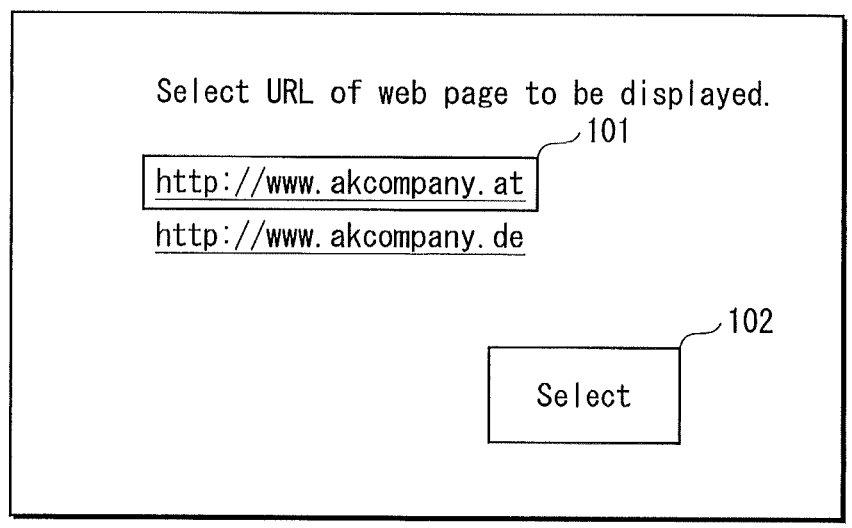
FIG. 10 illustrates a specific example of a. GUI display screen for receiving, when a plurality of URLs are found in the search in the web page display language control processing shown in FIG. 8, a selection of a URL of a web page to be displayed.

When "Yes" is selected in the GUI display screen (step S811: YES), the control unit 10 determines whether or not the number of URLs found in the search in step S808 is two or more (step S812). When the number of the found URLs is two or more (step S812: YES), the control unit 10 displays, on the liquid crystal display unit included in the operating panel 70, a GUI display screen for further receiving a selection of a URL of a web page to be displayed (step S813). FIG. 10 shows a specific example of the above-mentioned GUI display screen. Reference signs 101 and 102 respectively indicate a cursor to select a URL and a selection button for confirming the selection. In the display screen shown in FIG. 10, a user performs an operation to select a URL by moving the cursor 101 onto the URL to be selected, and then clicking the selection button 102.

When the URL of the web page to be displayed is selected from the GUI display screen in step S813, the control unit 10 acquires the web page indicated by the selected URL from a web server indicated by a domain name in the selected URL, and displays the acquired web page on the liquid crystal display unit included in the operating panel 70 (step S814).

When the result of the determination in step S812 is negative (step S812: NO), the control unit 10 acquires a web page indicated by the URL found in the search in step S809 from a web server indicated by a domain name in the found URL, and displays the acquired web page on the liquid crystal display unit included in the operating panel 70 (step S815).

When the result of the determination in step S805 is negative (step S805: NO), the result of the determination in step S809 is negative (step S809: NO), and the result of the determination in step S811 is negative (step S811: NO), the control unit 10 acquires the web page indicated by the URL designated in step S804 from a web server indicated by a domain name in the designated URL, and displays the acquired web page on the liquid crystal display unit included in the operating panel 70 (step S816).

Upon receiving input of a browser termination instruction from the operating panel 70 (step S817: YES), the control unit 10 terminates the browser by stopping execution of the browser program 1022.

Figure 11:
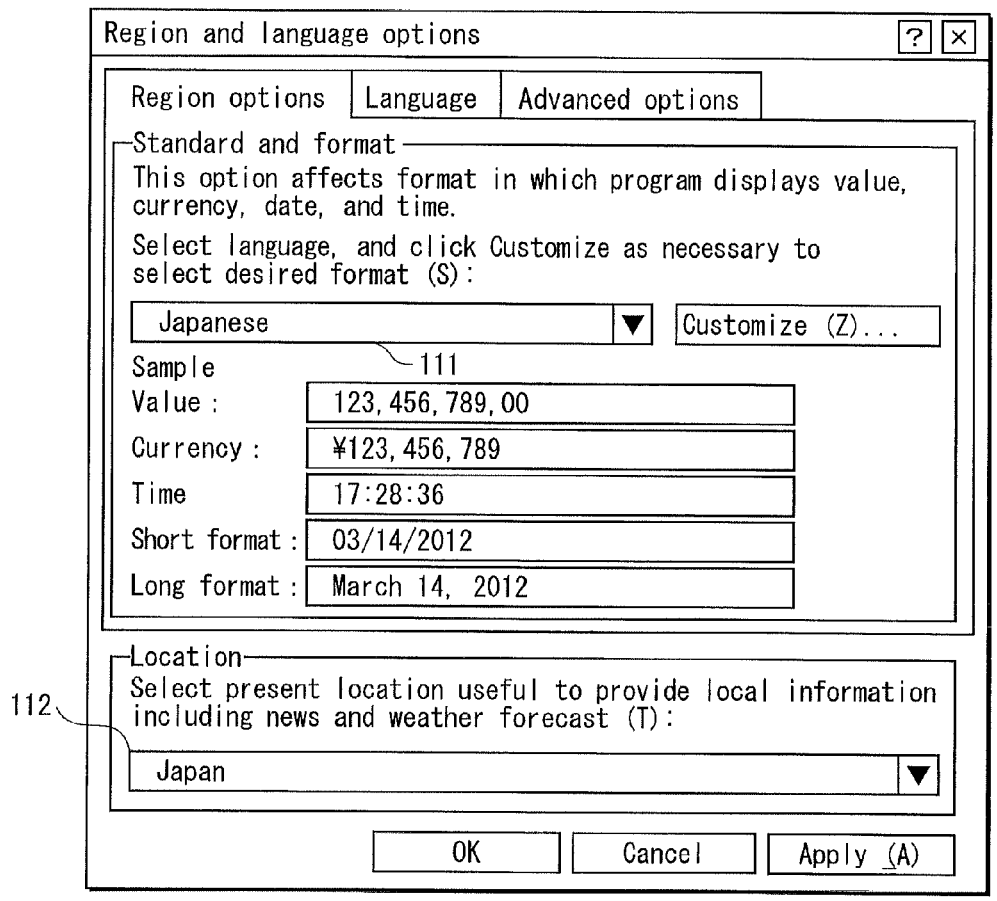
FIG. 11 illustrates a specific example of a language setting screen displayed on the display unit by executing an OS 2041.
Figure 12:
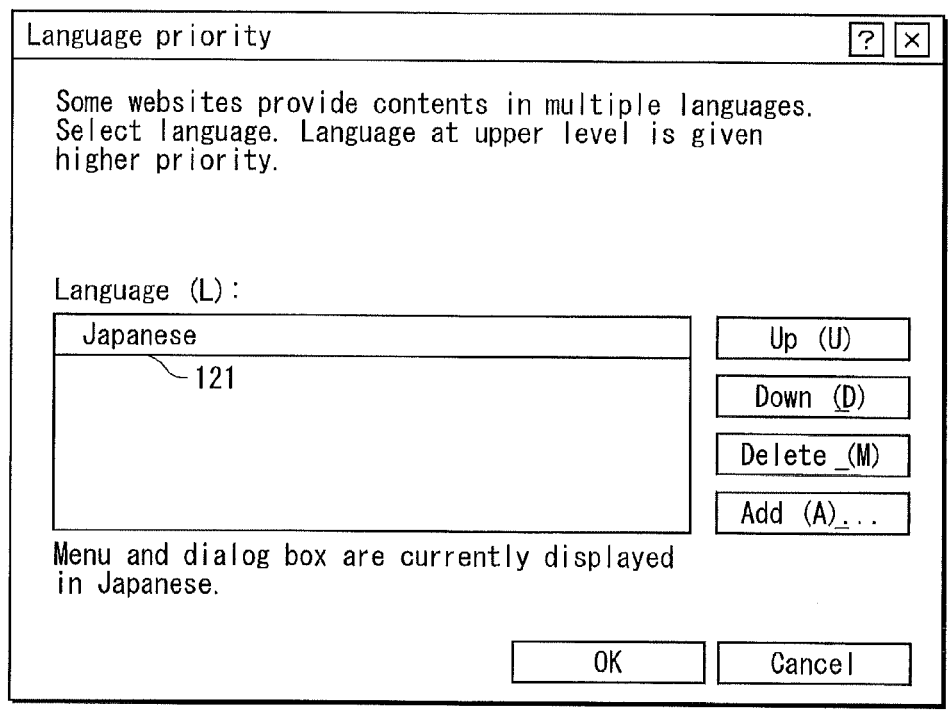
FIG. 12 illustrates a specific example of a language setting screen displayed on the display unit by executing a browser program 2042.

The web page display language control processing described above is performed by each of the PCs 2 and 3 in a similar manner by executing the browser program 2042 stored in the HDD 204. In each of the PCs 2 and 3, the text language designated by a user is acquired by receiving input of the designated language from the user via the language setting screen (GUI display screen) displayed on the display unit 205 by executing the OS 2041 and the browser program 2042, and is stored in the HDD 204 as language setting information of the OS and the browser. FIG. 11 illustrates a specific example of the language setting screen displayed on the display unit 205 by executing the OS 2041. FIG. 12 illustrates a specific example of the language setting screen displayed on the display unit 205 by executing the browser program 2042. In each of FIGS. 11 and 12, the designated language is set to Japanese (see a box 111 in FIG. 11 and a box 121 in FIG. 12).

Figure 13:
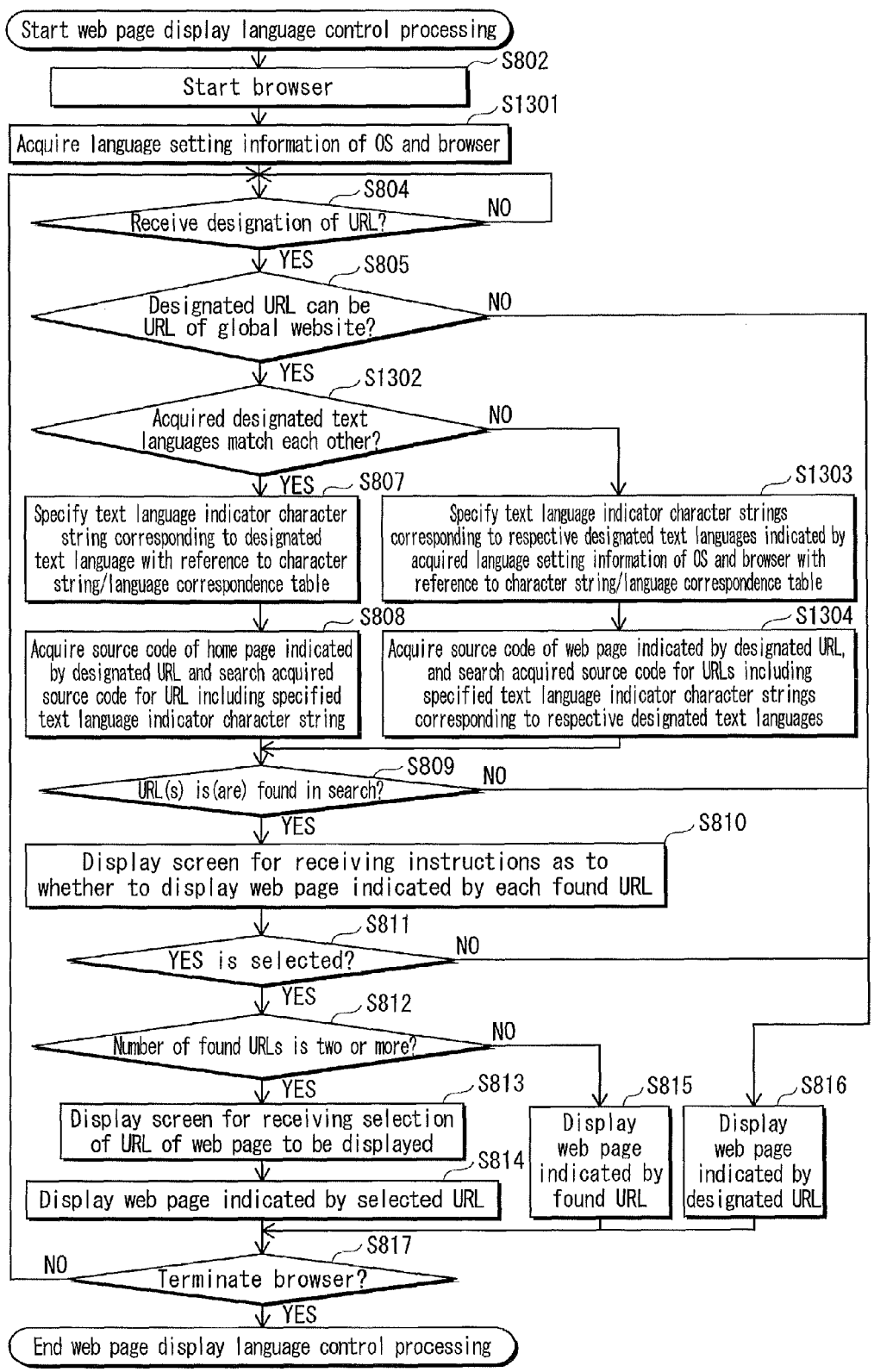
FIG. 13 is a flow chart showing a web page display language control processing performed by the PC 2.

FIG. 13 is a flow chart showing the web page display language control processing performed by the PC 2. Note that, as with the PC 2, the PC 3 performs the web page display language control processing in accordance with the flow chart of FIG. 13. Hereinafter, steps similar to those in the web page display language control processing shown in FIG. 8 are assigned with the same step numbers as those in FIG. 8, and differences from the processing shown in FIG. 8 are mainly described. Upon receiving input of a browser start instruction from the operating unit 206, the PC 2 starts a browser by starting execution of the browser program 2042 stored in the HDD 204 (step S802), and acquires the language setting information of the OS and the language setting information of the browser stored in the HDD 204 (step S1301). Upon further receiving a designation of a URL from the operating unit 206 (step S804: YES), the PC 2 transitions to processing in step S805.

When the result of the determination in step S805 is affirmative (step S805: YES), the PC 2 determines whether or not the designated text language indicated by the language setting information of the OS matches the designated text language indicated by the language setting information of the browser acquired in step S1301 (step S1302). When they do not match (the number of designated text languages is two or more) (step S1302: NO), the PC 2 specifies the text language indicator character strings corresponding to the respective designated text languages indicated by the acquired language setting information pieces of the OS and the browser, with reference to the character string/language correspondence table 2043 stored in the HDD 204 (step S1303).

The PC 2 then transmits, to a web server indicated by a domain name in the designated URL, an HTTP request with a designation of the URL, acquires source code of a home page indicated by the designated URL from the web server, and searches the acquired source code for URLs including the specified text language indicator character strings corresponding to the respective designated text languages indicated by the language setting information pieces acquired in step S1301 (step S1304).

According to this structure, when there is a possibility that the designated URL is a URL of a home page of a global website, a URL including a text language indicator character string indicating a text language designated by the user is found in the search of the source code of a web page indicated by the designated URL, and a web page indicated by the found URL is acquired and displayed. A web page in the text language designated by the user can thus be acquired from the global website and displayed with a simple structure.

(Modifications)

Although the present invention has been described based on the above-mentioned embodiment, it is obvious that the present invention is not limited to the above-mentioned embodiment. The following modifications also fall within a scope of the present invention.

(1) In the present embodiment, in the web page display language control processing, a web page in a text language designated by a user is acquired from a global website and displayed. Considering that the global website provides web pages for respective countries, by the user designating in advance not only a text language but also a country (hereinafter, referred to as a "provider country") providing web pages, a web page for the provider country and in the text language designated by the user may be acquired and displayed in the web page display language control processing.

Specifically, the present embodiment may be modified as follows. As shown in FIG. 14, information showing correspondences among identification numbers (IDs) and designated text languages of users using the image forming apparatus 1, and provider countries (hereinafter, referred to as "designated provider countries") designated by the users is stored in the user information storage unit 107 as the user information.

Furthermore, as shown in FIG. 15, a table showing correspondences among text language indicator character strings, provider countries, and text languages indicated by the respective text language indicator character strings is stored in the character string/language correspondence table storage unit 105 as the character string/language correspondence table.

Figure 16:
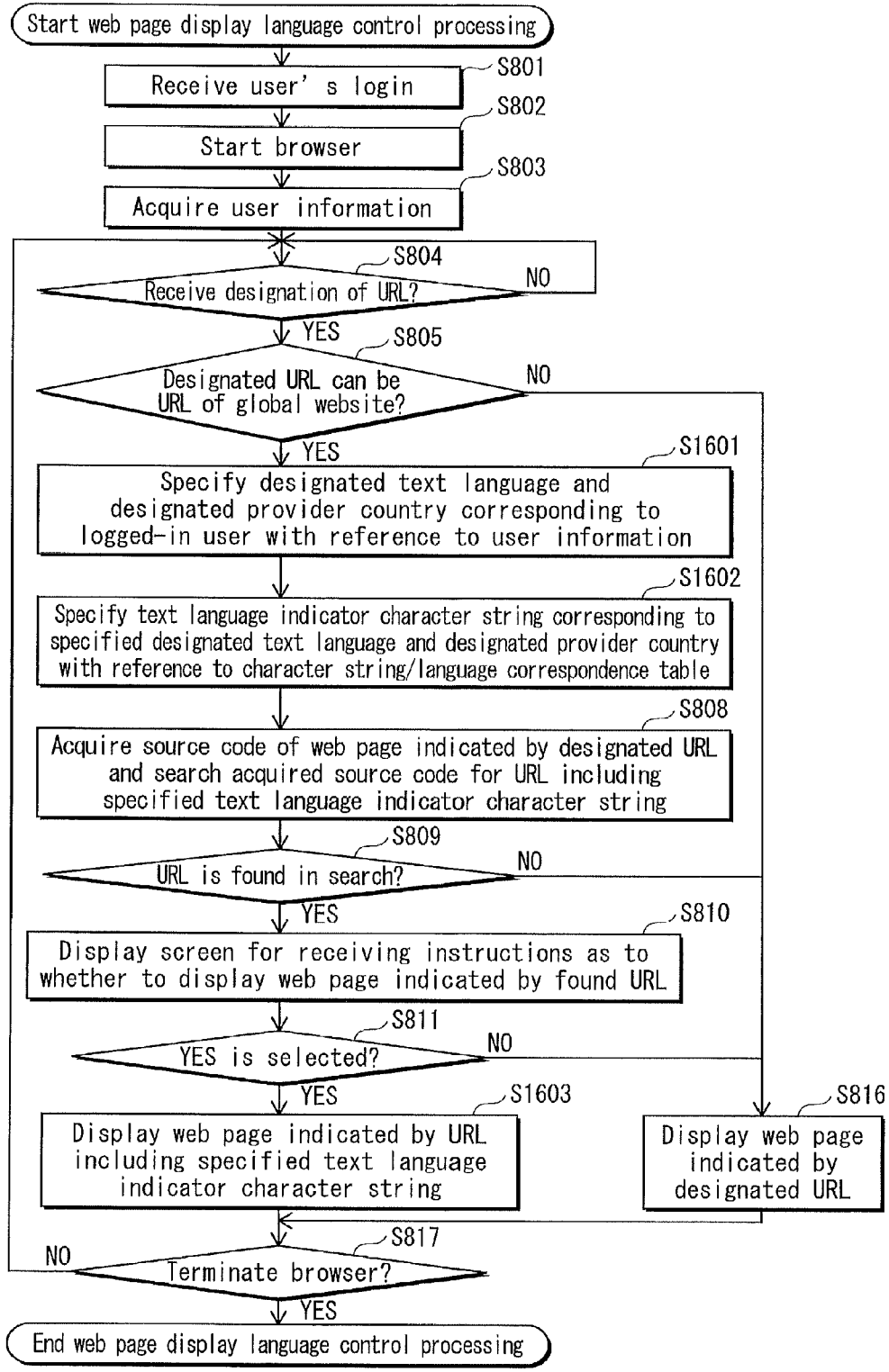
FIG. 16 is a flow chart showing a modification of the web page display language control processing performed by the control unit 10.

The control unit 10 may perform the web page display language control processing shown in a flow chart of FIG. 16. Hereinafter, steps identical to those in the web page display language control processing shown in FIG. 8 are assigned with the same step numbers as those in FIG. 8, and differences from the processing shown in FIG. 8 are mainly described.

After performing the processing in step S805, the control unit 10 specifies a designated text language and a designated provider country corresponding to a user ID of a logged-in user with reference to the acquired user information (step S1601), and further specifies a text language indicator character string corresponding to the specified designated text language and designated provider country with reference to the character string/language correspondence table stored in the character string/language correspondence table storage unit 105 (step S1602).

Furthermore, when the result of the determination in step S811 is affirmative (step S811: YES), the control unit 10 acquires a web page indicated by a URL including the text language indicator character string specified in step S1602 from a web server indicated by a domain name in the URL, and displays the acquired web page on the liquid crystal display unit included in the operating panel 70 (step S1603).

The PCs 2 and 3 may also perform processing similar to the web page display language control processing shown in FIG. 16.

Specifically, the processing may be performed as follows. Information on the designated provider country is acquired by receiving input of a designated country from a user via a regional setting screen (a box 112 in FIG. 11) displayed on the display unit by executing the OS, and the acquired information is stored in the HDD 204 as regional setting information.

Furthermore, the table shown in FIG. 15 is stored in the HDD 204 as the character string/language correspondence table. Processing similar to the processing in step S1601 in FIG. 16, i.e. processing to specify the designated text language and the designated provider country from the language setting information of the OS and the regional setting information stored in the HDD 204, is then performed. Furthermore, as with the processing in step S1602 in FIG. 16, a text language indicator character string corresponding to the specified designated text language and designated provider country is specified with reference to the character string/language correspondence table stored in the HDD 204. As with the processing in step S1603 in FIG. 16, a web page indicated by a URL including the specified text language indicator character string is acquired from a web server indicated by a domain name in the URL and displayed on the display unit 205.

According to this structure, when there is a possibility that the designated URL is a URL of a home page of a global website, a URL including the text language indicator character string that indicates the designated text language and corresponds to the designated provider country is found in the search of the source code of the web page indicated by the designated URL, and the web page indicated by the found URL is acquired and displayed. Therefore, when the global website includes a plurality of links to web pages in the designated text language, a web page provided by the designated provider country, which meets user needs, can be acquired and displayed.

(2) In the present embodiment, in the web page display language control processing, when the URL including the specified text language indicator character string cannot be found in the source code of the home page, search for the URL including the specified text language indicator character string is no longer performed in source code of web pages other than the home page. In global websites, however, an index web page including a list of links to web pages in multiple text languages may be a web page other than the home page. Therefore, when the URL including the specified character string cannot be found in the source code of the home page, search for a URL of the index web page may be performed, and source code of the index web page may be searched for the URL including the specified text language indicator character string.

Specifically, the present embodiment may be modified as follows. The manufacturer of the image forming apparatus 1 examines in advance character strings (e.g. "worldwide/index.html", "global/index.html", "worldwide_sites", and "directory/index.html", hereinafter referred to as "index page indicator character strings") used in URLs of index web pages in source code of web pages of global websites, and stores a list of index page indicator character strings in the character string/language correspondence table storage unit 105. FIG. 17 shows a specific example of the list of index page indicator character strings.

Figure 18:
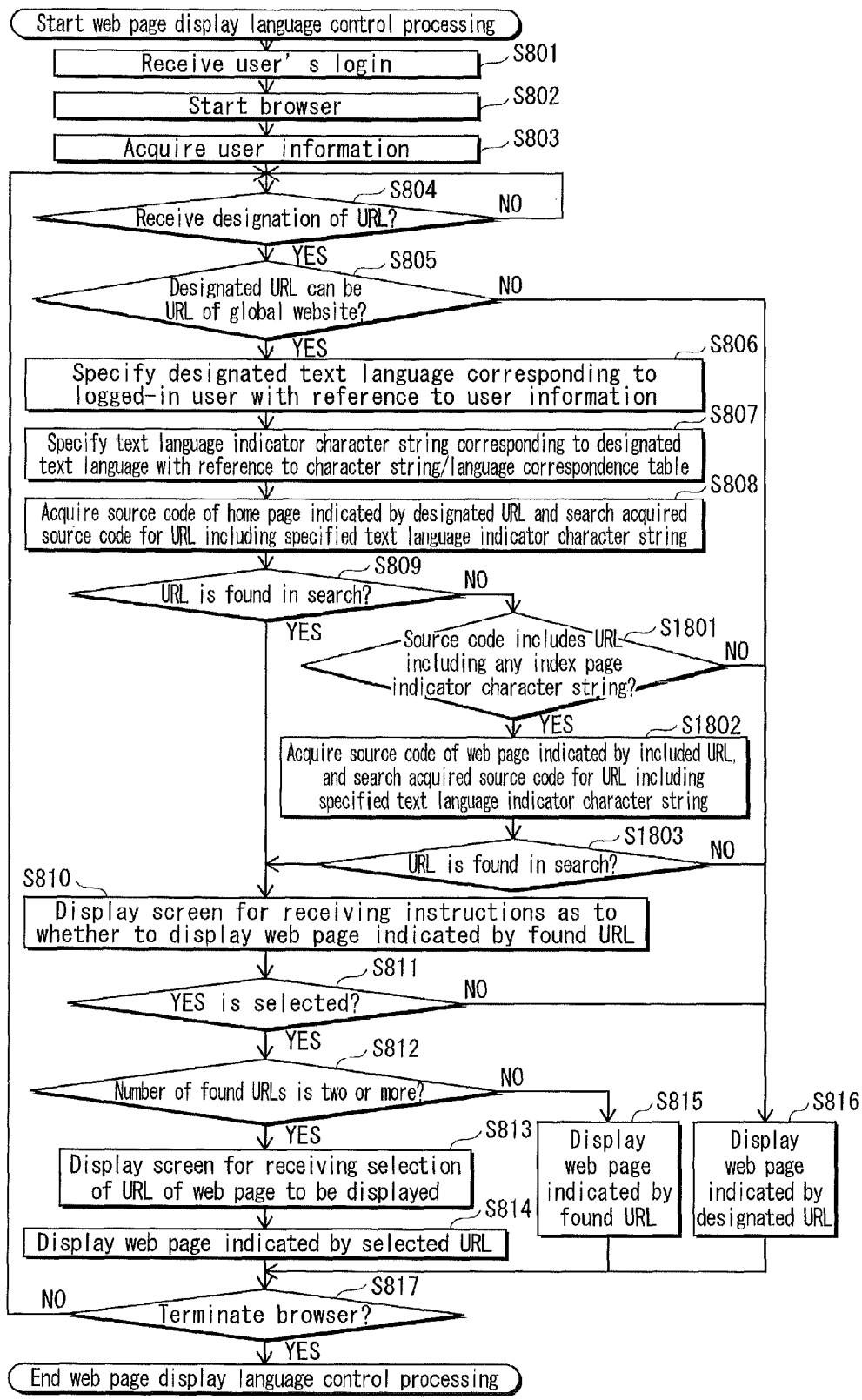
FIG. 18 is a flow chart showing another modification of the web page display language control processing performed by the control unit 10.

The control unit 10 may perform the web page display language control processing shown in a flow chart of FIG. 18. Hereinafter, steps identical to those in the web page display language control processing shown in FIG. 8 are assigned with the same step numbers as those in FIG. 8, and differences from the processing shown in FIG. 8 are mainly described.

When the result of the determination in step S809 is negative (step S809: NO), the control unit 10 determines whether or not source code of a home page indicated by the URL designated in step S804 includes a URL including any index page indicator character string in the list of index page indicator character strings stored in the character string/language correspondence table storage unit 105 (step S1801).

When the source code includes the URL including any index page indicator character string (step S1801: YES), the control unit 10 transmits, to a web server indicated by a domain name in the included URL, an HTTP request with a designation of the included URL, acquires source code of a web page indicated by the included URL from the web server, and searches the acquired source code for a URL including the text language indicator character string specified in step S807 (step S1802). When the URL including the specified text language indicator character string is found in the search (step S1803: YES), processing transitions to processing in step S810.

For example, source code of a home page indicated by a URL "http://www.ABCcompany.com/" shown in FIG. 19A does not include URLs of web pages in multiple text languages. When the source code includes an index page indicator character string (in an example of FIG. 19A, a character string within a dotted rectangle 191 ("http://www.ABCcompany.com/worldwide/index.html")), however, source code of a web page (index web page) indicated by the URL including the index page indicator character string shown in FIG. 19B is acquired, and the acquired source code (a part of the description of the source code including URLs of web pages in multiple text languages, within a dotted rectangle 192 in FIG. 19B) is searched for a URL including the text language indicator character string specified in step S807.

The PCs 2 and 3 may also perform a processing similar to the web page display language control processing shown in FIG. 18. Specifically, as in the image forming apparatus 1, the list of index page indicator character strings is stored in the HDD 204. When the result of the determination in step S809 in FIG. 13 is negative (step S809: NO), processing similar to processing in steps S1801 to S1803 in FIG. 18 is performed. When the result of the determination in step S1803 is affirmative (step S1803: YES), processing transitions to processing in step S810.

According to this structure, even when source code of a home page of a global website does not include URLs of web pages in multiple text languages, a URL of an index web page including links to the web pages in the multiple text languages is found in search, source code of the index web page is searched for a URL including the text language indicator character string indicating the designated text language, and a web page indicated by the URL including the text language indicator character string is acquired and displayed. As a result, efficiency of search for the web page in the designated text language can be increased.

(3) In the present embodiment, in the web page display language control processing, as the predetermined top-level domain used for the determination in step S805 (determination of whether or not there is a possibility that the designated URL is a URL of a home page of a global website), a top-level domain "com" is used. As the top-level domain used in a URL of a global website, however, a top-level domain other than the top-level domain "com" (e.g. a top-level domain "net") may be used. Therefore, a plurality of top-level domains (e.g. top-level domains "com" and "net") may be used as the predetermined top-level domain used for the determination in step S805. The same applies to Modifications (1) and (2).

Furthermore, a URL of a home page of a global website may include the top-level domain "com" with a language code for English ("en" or "EN") added to the end thereof via the delimiter "/". Therefore, when the URL designated in step S804 includes the top-level domain "com" with a character string "/en" or "/EN" added to the end thereof, it may be determined that there is a possibility that the designated URL is a URL of a global website in step S805. The same applies to Modifications (1) and (2). The determination in step S805 may be performed not only by using a plurality of top-level domains as the predetermined top-level domain but also based on whether or not the URL designated in step S804 includes the top-level domain "com" with the character string "/en" or "/EN" added to the end thereof.

According to this structure, efficiency of finding a URL of a global website can be increased. As a result, efficiency of finding a web page in a designated text language in a global website can be increased.

SUMMARY

A non-transitory computer-readable recording medium having recorded thereon a browser program pertaining to one aspect of the present invention as disclosed above is a non-transitory computer-readable recording medium having recorded thereon a browser program running on a computer including a storage unit that stores a table showing correspondences between text languages of web pages and character strings used in URLs to indicate the respective text languages, the browser program causing the computer to perform: a receiving step of receiving a designation of a URL; an acquiring step of acquiring information indicating a text language designated by a user; a determining step of determining whether or not the designated URL includes, at the end thereof, a top-level domain "com" or the top-level domain "com" with a slash "/" added to the end thereof; a searching step of, when a result of the determination in the determining step is affirmative, acquiring source code of a web page indicated by the designated URL, and searching the acquired source code for a URL including a character string corresponding to the designated text language with reference to the table stored in the storage unit; and a display control step of, when the URL including the character string corresponding to the designated text language is found in the searching step, acquiring a web page indicated by the found URL from a web server over a network and displaying the acquired web page indicated by the found URL, and, when the URL including the character string corresponding to the designated text language is not found in the searching step, displaying the web page indicated by the designated URL according to the acquired source code.

Here, the acquiring step may acquire the information indicating the designated text language from a plurality of predetermined sources, when the designated text language comprises a plurality of designated text languages, the searching step may search the acquired source code for URLs including character strings corresponding to the respective designated text languages, the browser program may cause the computer to further perform a selection receiving step of when the URLs including the character strings corresponding to the respective designated text languages are found in the searching step, receiving a selection of one of the found URLs, and the display control step may acquire a web page indicated by the selected URL from the web server and display the acquired web page indicated by the selected URL.

The browser program may cause the computer to further perform a selection receiving step of, when the URL found in the searching step comprises a plurality of URLs, receiving a selection of one of the plurality of URLs, and the display control step may acquire a web page indicated by the selected URL from the web server and display the acquired web page indicated by the selected URL.

The determining step may further determine whether or not the designated URL includes, at the end thereof, a top-level domain "net" or the top-level domain "net" with the slash "/" added to the end thereof, and the searching step may further perform the search when the determining step determines that the designated URL includes, at the end thereof, the top-level domain "net", or the top-level domain "net" with the slash "/" added to the end thereof.

The determining step may further determine whether or not the designated URL includes, at the end thereof, the top-level domain "coin" with a character string "/en" or "/EN" added to the end thereof, and the searching step may further perform the search when the determining step determines that the designated URL includes, at the end thereof, the top-level domain "com" with the character string "/en" or "/EN" added to the end thereof. Furthermore, the computer may be included in an image forming apparatus.

With the above-mentioned structure, when there is a possibility that the designated URL is a URL of a home page of a global website as the designated URL includes, at the end thereof, the top-level domain "com" or the top-level domain "com" with the slash "/" added to the end thereof, the URL including the character string indicating the text language designated by the user is found in the search of the source code of the web page indicated by the designated URL, and the web page indicated by the found URL is acquired and displayed. The web page in the text language designated by the user can thus be acquired from the global website and displayed with a simple structure.

Here, the browser program may cause the computer to further perform an instruction receiving step of, when the URL including the character string corresponding to the designated text language is found in the searching step, receiving an instruction as to whether or not to display the web page indicated by the found URL from the user, and, when the instruction receiving step receives an instruction not to display the web page indicated by the found URL, the display control step may refrain from acquiring and displaying the web page indicated by the found URL.

According to this structure, the web page indicated by the found URL is displayed only when the instruction to display the web page indicated by the found URL is received from the user, and the display of the web page indicated by the found URL is inhibited and the web page indicated by the designated URL is displayed when the user does not wish to display the web page indicated by the found URL. Therefore, whether or not to display the web page in the text language designated by the user is determined according to the needs of the user, and the convenience of the user in the web page display processing is increased.

In the table stored in the storage unit, the character strings used in the URLs may further be associated with names of countries of providers of web pages, the acquiring step may further acquire information indicating a name of a country designated by the user, and the searching step may search the acquired source code for a URL including a character string corresponding to the designated text language and the designated name of the country with reference to the table stored in the storage unit.

According to this structure, when there is a possibility that the designated URL is a URL of a home page of a global website, the URL that includes the character string indicating the designated text language and pertains to the provider country designated by the user is found in the search of the source code of the web page indicated by the designated URL, and the web page indicated by the found URL is acquired and displayed. When the global website includes a plurality of links to web pages in the designated text language, the web page that meets the needs of the user is acquired and displayed.

The storage unit may further store therein a predetermined character string used in a URL of an index web page that includes a list of links to one or more web pages indicated by URLs including character strings indicating respective text languages, the browser program may cause the computer to further perform: a second determining step of, when the URL including the character string corresponding to the designated text language is not found in the searching step, determining whether or not the acquired source code includes the URL of the index web page by determining whether or not the acquired source code includes the URL including the predetermined character string; and a second searching step of, when the acquired source code includes the URL including the predetermined character string, acquiring a source code of a web page indicated by the URL including the predetermined character string, and searching the acquired source code of the web page indicated by the URL including the predetermined character string for the URL including the character string corresponding to the designated text language, and, when the URL including the character string corresponding to the designated text language is found in the second searching step, the display control step may acquire a web page indicated by the URL found in the second searching step from the web server over the network and display the acquired web page indicated by the URL found in the second searching step.

According to this structure, when the source code of the home page of the global website does not include the URL including the character string indicating the designated text language, but includes the URL including the predetermined character string indicating the index web page having the list of links to the web pages indicated by the URLs including the character strings indicating the respective text languages, the source code of the index web page is acquired, the URL including the character string indicating the text language designated by the user is found in the search of the source code of the index web page, and the web page indicated by the found URL is acquired and displayed. As a result, efficiency of search for the web page in the designated text language can be increased.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A non-transitory computer-readable recording medium having recorded thereon a browser program running on a computer including a storage unit that stores a table showing correspondences between text languages of web pages and character strings used in URLs to indicate the respective text languages, the browser program causing the computer to perform:
   a receiving step of receiving a designation of a URL;
   an acquiring step of acquiring information indicating a text language designated by a user;
   a first searching step of searching for a top-level domain "com" or the top-level domain "com" with a slash "/" added to the end of the designated URL;
   a determining step of determining whether or not the designated URL includes, at the end thereof, the top-level domain "com" or the top-level domain "com" with a slash "/" added to the end thereof;
   a second searching step of, when the determining step determines that a top-level domain "com" or the top-level domain "com" with a slash "/" has been added to the end of the designated URL, acquiring source code of a web page indicated by the designated URL, and searching the acquired source code for a URL including a character string corresponding to the designated text language with reference to the table stored in the storage unit; and
   a display control step of, when the URL including the character string corresponding to the designated text language is found in the second searching step, acquiring a web page indicated by the found URL from a web server over a network and displaying the acquired web page indicated by the found URL, and, when the URL including the character string corresponding to the designated text language is not found in the second searching step, displaying the web page indicated by the designated URL according to the acquired source code.

2. The non-transitory computer-readable recording medium according to claim 1, wherein
   the browser program causes the computer to further perform:
   an instruction receiving step of, when the URL including the character string corresponding to the designated text language is found in the searching step, receiving an instruction as to whether or not to display the web page indicated by the found URL from the user, and
   when the instruction receiving step receives an instruction not to display the web page indicated by the found URL, the display control step refrains from acquiring and displaying the web page indicated by the found URL.

3. The non-transitory computer-readable recording medium according to claim 1, wherein
   the acquiring step acquires the information indicating the designated text language from a plurality of predetermined sources,
   when the designated text language comprises a plurality of designated text languages, the second searching step searches the acquired source code for URLs including character strings corresponding to the respective designated text languages,
   the browser program causes the computer to further perform:
   a selection receiving step of, when the URLs including the character strings corresponding to the respective designated text languages are found in the second searching step, receiving a selection of one of the found URLs, and
   the display control step acquires a web page indicated by the selected URL from the web server and displays the acquired web page indicated by the selected URL.

4. The non-transitory computer-readable recording medium according to claim 1, wherein
   the browser program causes the computer to further perform:
   a selection receiving step of, when the URL found in the second searching step comprises a plurality of URLs, receiving a selection of one of the plurality of URLs, and
   the display control step acquires a web page indicated by the selected URL from the web server and displays the acquired web page indicated by the selected URL.

5. The non-transitory computer-readable recording medium according to claim 1, wherein in the table stored in the storage unit, the character strings used in the URLs are further associated with names of countries of providers of web pages, the acquiring step further acquires information indicating a name of a country designated by the user, and the second searching step searches the acquired source code for a URL including a character string corresponding to the designated text language and the designated name of the country with reference to the table stored in the storage unit.

6. The non-transitory computer-readable recording medium according to claim 1, wherein the storage unit further stores therein a predetermined character string used in a URL of an index web page that includes a list of links to one or more web pages indicated by URLs including character strings indicating respective text languages, the browser program causes the computer to further perform:

a second determining step of, when the URL including the character string corresponding to the designated text language is not found in the second searching step, determining whether or not the acquired source code includes the URL of the index web page by determining whether or not the acquired source code includes the URL including the predetermined character string; and a third searching step of, when the acquired source code includes the URL including the predetermined character string, acquiring a source code of a web page indicated by the URL including the predetermined character string, and searching the acquired source code of the web page indicated by the URL including the predetermined character string for the URL including the character string corresponding to the designated text language, and when the URL including the character string corresponding to the designated text language is found in the third searching step, the display control step acquires a web page indicated by the URL found in the third searching step from the web server over the network and displays the acquired web page indicated by the URL found in the third searching step.

7. The non-transitory computer-readable recording medium according to claim 1, wherein the determining step further determines whether or not the designated URL includes, at the end thereof, a top-level domain "net" or the top-level domain "net" with the slash "/" added to the end thereof, and the second searching step further performs the search when the determining step determines that the designated URL includes, at the end thereof, the top-level domain "net", or the top-level domain "net" with the slash "/" added to the end thereof.

8. The non-transitory computer-readable recording medium according to claim 1, wherein the determining step further determines whether or not the designated URL includes, at the end thereof, the top-level domain "com" with a character string "/en" or "/EN" added to the end thereof, and the second searching step further performs the search when the determining step determines that the designated URL includes, at the end thereof, the top-level domain "com" with the character string "/en" or "/EN" added to the end thereof.

9. The non-transitory computer-readable recording medium according to claim 1, wherein the computer is included in an image forming apparatus.

10. The non-transitory computer-readable recording medium according to claim 1, wherein the acquiring step acquires the information indicating the text language designated by the user based on information associating one or more users with one or more languages.

11. A display device comprising:

a display unit;

a storage unit storing a table showing correspondences between text languages of web pages and character strings used in URLs to indicate the respective text languages; and a browser configured to acquire a web page from a web server over a network, and cause the display unit to display the web page acquired from the web server, wherein the browser comprises:

a receiving unit receiving a designation of a URL;

an acquiring unit acquiring information indicating a text language designated by a user;

a first searching unit for searching for a top-level domain "com" or the top-level domain "com" with a slash "/" added to the end of the designated URL;

a determining unit determining whether or not the designated URL includes, at the end thereof, the top-level domain "com" or the top-level domain "com" with a slash "/" added to the end thereof;

a second searching unit, when the determining step determines that a top-level domain "com" or the top-level domain "com" with a slash "/" has been added to the end of the designated URL, acquiring source code of a web page indicated by the designated URL, and searching the acquired source code for a URL including a character string corresponding to the designated text language with reference to the table stored in the storage unit; and a display control unit, when the URL including the character string corresponding to the designated text language is found by the second searching unit, acquiring a web page indicated by the found URL from the web server over the network and displaying the acquired web page indicated by the found URL, and, when the URL including the character string corresponding to the designated text language is not found by the second searching unit, displaying the web page indicated by the designated URL according to the acquired source code.

12. The display device according to claim 11, wherein the browser causes a computer to further perform when the URL including the character string corresponding to the designated text language is found in the second searching unit, receiving an instruction as to whether or not to display the web page indicated by the found URL from the user, and when an instruction not to display the web page indicated by the found URL is received, the display control unit refrains from acquiring and displaying the web page indicated by the found URL.

13. The display device according to claim 11, wherein the acquiring unit acquires the information indicating the designated text language from a plurality of predetermined sources, when the designated text language comprises a plurality of designated text languages, the second searching unit searches the acquired source code for URLs including character strings corresponding to the respective designated text languages, a browser program causes a computer to further perform:
when the URLs including the character strings corresponding to the respective designated text languages are found in the second searching unit, receiving a selection of one of the found URLs, and
the display control unit acquires a web page indicated by the selected URL from the web server and displays the acquired web page indicated by the selected URL.

14. The display device according to claim 11, wherein a browser program causes a computer to further perform:
when the URL found in the second searching unit comprises a plurality of URLs, receiving a selection of one of the plurality of URLs, and
the display control unit acquires a web page indicated by the selected URL from the web server and displays the acquired web page indicated by the selected URL.

15. The display device according to claim 11, wherein:
in the table stored in the storage unit, the character strings used in the URLs are further associated with names of countries of providers of web pages,
the acquiring unit further acquires information indicating a name of a country designated by the user, and
the second searching unit searches the acquired source code for a URL including a character string corresponding to the designated text language and the designated name of the country with reference to the table stored in the storage unit.

16. The display device according to claim 11, wherein:
the storage unit further stores therein a predetermined character string used in a URL of an index web page that includes a list of links to one or more web pages indicated by URLs including character strings indicating respective text languages,
a browser program causes a computer to further perform:
when the URL including the character string corresponding to the designated text language is not found in the second searching unit, determining whether or not the acquired source code includes the URL of the index web page by determining whether or not the acquired source code includes the URL including the predetermined character string; and
when the acquired source code includes the URL including the predetermined character string, acquiring a source code of a web page indicated by the URL including the predetermined character string, and searching the acquired source code of the web page indicated by the URL including the predetermined character string for the URL including the character string corresponding to the designated text language, and
when the URL including the character string corresponding to the designated text language is found in the second searching unit, the display control unit acquires a web page indicated by the URL found in the second searching unit from the web server over the network and displays the acquired web page indicated by the URL found in the second searching unit.

17. The display device according to claim 11, wherein:
the determining unit further determines whether or not the designated URL includes, at the end thereof, a top-level domain "net" or the top-level domain "net" with the slash "/" added to the end thereof, and
the second searching unit further performs the search when the determining unit determines that the designated URL includes, at the end thereof, the top-level domain "net", or the top-level domain "net" with the slash "/" added to the end thereof.

18. The display device according to claim 11, wherein:
the determining unit further determines whether or not the designated URL includes, at the end thereof, the top-level domain "com" with a character string "/en" or "/EN" added to the end thereof, and
the second searching unit further performs the search when the determining step determines that the designated URL includes, at the end thereof, the top-level domain "com" with the character string "/en" or "/EN" added to the end thereof.

19. The display device according to claim 11, wherein a computer is included in an image forming apparatus.

20. The display device according to claim 11, wherein the acquiring unit acquires the information indicating the text language designated by the user based on information associating one or more users with one or more languages.

* * * * *